United States Patent [19]

Takeda

[11] Patent Number: 4,537,801
[45] Date of Patent: Aug. 27, 1985

[54] COATING METHOD AND APPARATUS

[75] Inventor: Hideo Takeda, Kanagawa, Japan

[73] Assignee: Fuji Photo Film Co., Ltd., Kanagawa, Japan

[21] Appl. No.: 497,281

[22] Filed: May 23, 1983

[30] Foreign Application Priority Data

May 25, 1982 [JP] Japan .................................. 57-87227

[51] Int. Cl.³ .............................................. B05D 3/12
[52] U.S. Cl. ..................................... 427/356; 427/357; 427/358; 118/123; 118/126; 118/402; 118/410; 118/411
[58] Field of Search ............... 427/358, 371, 331, 356; 118/410, 402, 123, 126, 411

[56] References Cited

U.S. PATENT DOCUMENTS

| | | | |
|---|---|---|---|
| 3,206,323 | 9/1965 | Miller et al. | 118/411 |
| 3,413,143 | 11/1968 | Cameron et al. | 118/411 |
| 3,461,837 | 8/1969 | Dreher | 118/119 |
| 3,496,012 | 2/1970 | Biorseth | 118/414 |
| 3,526,528 | 9/1970 | Takabashi et al. | 118/411 |
| 3,711,312 | 1/1973 | Yoshida et al. | 118/411 |
| 3,817,208 | 6/1974 | Barnscheidt et al. | 118/119 |
| 4,245,582 | 1/1981 | Alheid et al. | 118/119 |

Primary Examiner—Norman Morgenstern
Assistant Examiner—Janyce A. Bell
Attorney, Agent, or Firm—Sughrue, Mion, Zinn, Macpeak & Seas

[57] ABSTRACT

In a coating method, a web is run along a stationary metering member having a curved smooth surface at the upper end in such a manner that the web is in contact with the smooth surface, a solution which is substantially the same in composition as a coating solution is continuously supplied to the web at a position which is before the metering member, to wet the coating surface of said web, and a predetermined quantity of coating solution is supplied continuously to the web at a position which is after the metering member.

6 Claims, 3 Drawing Figures

COATING METHOD AND APPARATUS

BACKGROUND OF THE INVENTION

1. Field of the Invention

This invention relates to a novel coating method and a novel coating apparatus useful for practicing the same, more particularly to a coating method which is suitable for applying a coating solution such as one for forming a magnetic recording medium which is of relatively high viscosity.

2. Description of the Prior Art

The term "web" as used herein is not limited and is intended to mean a relatively long, flexible, belt-shaped support such as: a plastic film of cellulose triacetate, polyamide, polyimide, polycarbonate, polyethylene terephthalate or polyvinyl chloride; paper; synthetic paper; a metal foil of aluminum, or copper; and a sheet of glass or ceramic and the like.

The term "coating solution" as used herein is not limited and is intended to mean a variety of coating solutions different in composition depending on the purposes of use. Examples of such "coating solutions" are coating solutions for forming a photosensitive emulsion layer, a base layer, a protective layer and a back layer as are conventionally used in a photographic photosensitive material; coating solutions for forming a magnetic layer, a base layer, a wetting layer, a protective layer and a back layer as are conventionally used in a magnetic recording medium; and coating solutions for forming an adhesive layer, a coloring layer, a rustproof layerings, etc. These coating solutions are made up of essential components, a binder, and, if desired or necessary, water or an organic solvent or dispersion containing various additives.

In order to form a coated film on the above-described web to a desired thickness, the following methods are now extensively employed: Conventional coating means such as a dip, reverse roll, gravure roll, extrusion hopper or slide hopper are used to apply an excess of coating solution to a web which is run continuously. Then, a metering means such as an air knife, blade or coil bar (or wire bar) is contacted with the coated layer to scrape off surplus coating solution to coat the web with the coating solution to the desired degree or thickness.

In coating a web with a coating solution of high viscosity such as a magnetic solution for forming a magnetic recording medium, a coil bar has been extensively employed as the metering means because it is simple in structure and can be readily handled as compared with an air knife or blade, and the coated surface is relatively stable in quality.

A conventional coating method using a coil bar is shown in FIG. 1.

As shown in FIG. 1, a web 1 is run continuously in the direction of the arrow, and a coating solution 3 is applied to the lower surface of the web 1 at a thickness larger than finally required to form a coated film 5 in the liquid state. Surplus coating solution 7 is scraped off by the coil bar 6 so that a coated film 8 is formed which is regulated by the gap which is defined by the cylindrical wall of the coil bar 6 and the surface of the web 1. If desired or necessary, for instance in the case of forming a magnetic layer, the same can be subjected to magnetic field orientation and to drying, and then wound. In FIG. 1, reference numeral 4 designates guide rolls rotating in the direction shown by the arrows.

Coil bar 6, as shown in FIG. 2, is made up of a core material or a rod member 9 and a wire 10 which is wound in the form of a single coil on the cylindrical wall of the rod member 9 with the turns being in close contact with each another. In general, the rod member 9 is a stainless steel, iron or brass rod 1 to 3 mm in diameter and the wire 10 is a stainless steel or "Teflon" wire 0.04 to 0.05 mm in diameter.

It is necessary to smooth the surface of the coated film or coated layer to various degrees depending on the purpose of use. After being subjected to metering with the coil bar, the coated film or coated layer is smoothed by suitable means.

In such a conventional coating method, the web is left in a gaseous circumference during the time interval from the time that the coating solution is applied to the web until the metering operation is carried out and during the time interval which from the instant that the metering operation is effected until the smoothing operation is carried out. During these time intervals the coated film is not yet dried and not yet hardened, and, therefore, the metering or smoothing operation is liable to be affected by the viscosity of the coating solution, interfacial tension, and web velocity.

During metering or smoothing air may enter between the metering member and the coated film or coating material which has been solidified on the metering bar may mix therewith, thus harming the coated surface. This tendency becomes significant as the viscosity of the coating solution increases and coating velocity increases. Therefore, rib-like (streak-like) stripes are formed on the coated surface, thus degrading the smoothness of the surface.

SUMMARY OF THE INVENTION

The inventors conducted intensive research to eliminate the above-described drawbacks, and discovered the following coating method, i.e., reached the present invention.

Per the present invention instead of a coil bar a stationary metering member is employed, and coating solution is applied to a running web through first and second slots which are disposed, respectively, before and after the metering member in the running direction of the web so that the coating surface of the web is wet by the coating solution from the first slot and is then coated with the coating solution from the second slot, and the coated surface is immediately smoothed by a smoother located after the second slot.

Per the above method, the above-described drawbacks are eliminated, and even if the web is coated with a coating solution of high viscosity at high speed, the resultant coated surface is excellent in flatness and smoothness.

DESCRIPTION OF PREFERRED EMBODIMENTS

This invention will now be described with reference to the accompanying FIG. 3.

Figure 1:
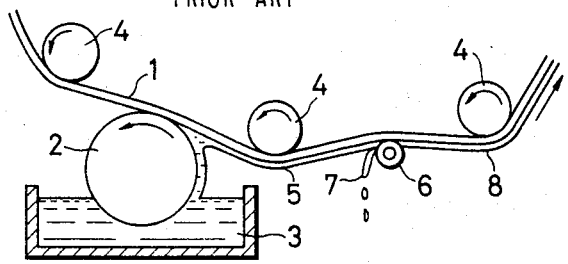
FIG. 1 is an explanatory diagram showing one example of a conventional coating method.
Figure 2:
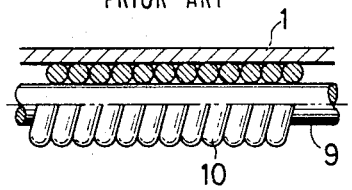
FIG. 2 is an enlarged sectional view showing a part of one example of a metering coil which is employed in the conventional method of FIG. 1.
Figure 3:
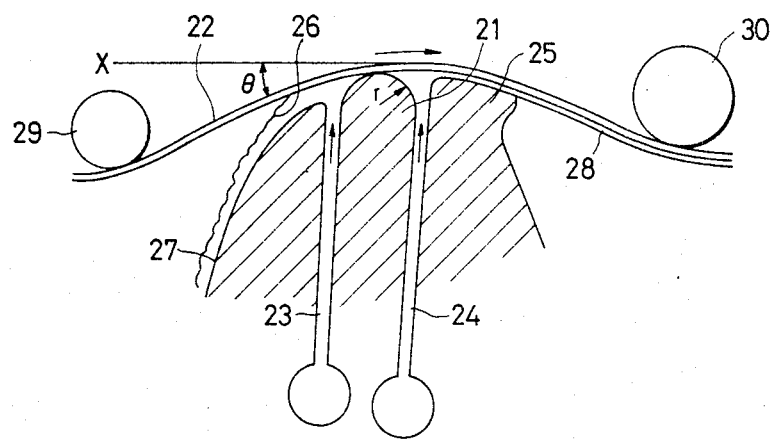
FIG. 3 is an explanatory diagram showing one example of a coating method according to this invention.

FIG. 3 is a sectional view showing one embodiment of the invention, which comprises: a metering member 21 having a curved smooth surface at the upper end thereof. The metering member 21 is different from conventional metering members in that the metering member of this embodiment does not effect a metering operation for regulating the thickness of a coated film; however, the term "metering member" is employed because it carries out a metering operation in the sense that movement of the coating solution which has wet a coating surface to the coating section is prevented and only a part of the coating solution used for wetting the coating surface is moved to the coating section. A slot 23 is provided before the metering member 21 and web 22 which runs continuously in the direction of the arrow is also shown. A slot 24 is provided after the metering member 21 and a smoother 25 is provided after the slot 24. It is preferred that the upper end surfaces of the metering member 21 and the smoother 25 are in one and the same plane or in a slightly curved plane.

In a coating operation according to the invention, while the web 22 is run continuously along the upper end surfaces of the metering member 21 and the smoother 25, a solution which is the same or substantially the same (per the invention) in composition as the coating solution is supplied to the surface of the web 22 to be coated through the slot 23 and simultaneously a predetermined quantity of coating solution is continuously supplied to the coating surface of the web 22 through the slot 24.

The solution supplied through the slot 23 wets the surface of the web to be coated and the surplus of this solution 26 can be recycled, dropping down sloped surface 27. The coating solution from the slot 24 is applied to the wet coated surface and is then formed into a coated film 28 by being smoothed by the smoother 25. The web thus treated then is dried. It goes without saying that in the case where a coating solution for forming a magnetic recording medium is employed, a treatment such as a magnetic field orientation may be carried out before drying.

In the above-described embodiment, the radius (r) of the upper end portion of the metering member is preferably 3 mm or less, more preferably 2.5 mm or less and it is preferred that slots 23 and 24 be 0.2 to 0.6 mm in width.

Furthermore, it is preferred that web 22 be run in such a manner that the angle $\theta$ between the web 22 and the horizontal plane X of the upper end surface of the metering member 21 be five to fifteen degrees (5° to 15°).

In FIG. 3, reference numerals 29 and 30 designate guide rolls. These guide rolls may be replaced by the rolls of the web.

The coating apparatus of the invention is designed as described above. Accordingly, in the coating apparatus, unlike a conventional coating apparatus, it is unnecessary to provide an intricate coil bar or a coil bar rotating mechanism.

The coated surface of the web is wet by the solution supplied through the slot 23, while the metering section is maintained in liquid-sealed state, so that mixing of air with the coated solution is completely prevented and mixing of solidified coating solution (which is encountered with a conventional coil bar) is completely prevented. Furthermore, per the invention the coating solution is supplied immediately after the metering member. Accordingly, the coating solution is supplied, under liquid-sealed conditions, to the surface of the web to be coated which has been sufficiently wet. Therefore, the coating solution thus supplied is all formed into the coated film, which is smoothed by the smoother immediately to have an excellent coated surface.

While the invention has been described in detail and with reference to the specific embodiment thereof, it will be apparent to one skilled in the art that various changes and modifications can be made therein without departing from the spirit and scope thereof.

What is claimed is:

1. In coating method which comprises applying a solution to a continuously running web, the improvement wherein the web is run along a stationary metering member having a curved smooth surface at the upper end in such a manner that said web is in contact with said smooth surface, a solution which is substantially the same in composition as the coating solution is continuously supplied to the web at a position which is before said metering member to wet the surface of the web to be coated and a predetermined quantity of coating solution is continuously supplied to the web at a position which is after said metering member.

2. In coating apparatus for coating a continuously running web, the improvement wherein the apparatus comprises a stationary metering member having a curved smooth surface at the upper end, a web wetting solution supplying slot which is located before the metering member, a coating solution supplying slot which is positioned after the metering member, a smoother which is disposed after the coating solution supplying slot, and a source of a solution which is substantially the same in composition as the coating solution, said solution of substantially the same composition continuously supplied through the web wetting solution supplying slot to the web which is run continuously along the upper surfaces of the metering member and the smoother while the coating solution is continuously supplied to the web through the coating solution supplying slot.

3. The apparatus of claim 2 wherein said curved surface of said stationary metering member has a radius of curvature of less than 3 mm.

4. The apparatus of claim 3 wherein said coating solution supply slot and said wetting solution supply slot have widths in the range of 0.2 to 0.6 mm.

5. The apparatus of claim 2 wherein said coating solution supply slot and said wetting solution supply slot have widths in the range of 0.2 to 0.6 mm.

6. The apparatus of claim 2 wherein an angle $\theta$ between the running web and a horizontal line tangent to an upper surface of said metering member is $5° < \theta < 15°$.

* * * * *